United States Patent
Velusamy

(10) Patent No.: US 11,455,671 B2
(45) Date of Patent: *Sep. 27, 2022

(54) MARKETPLACE LISTING GENERATION USING MESSAGE METADATA

(71) Applicant: eBay Inc., San Jose, CA (US)

(72) Inventor: Lakshmanan Velusamy, Bellevue, WA (US)

(73) Assignee: EBAY INC., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/593,721

(22) Filed: Oct. 4, 2019

(65) Prior Publication Data

US 2020/0034905 A1 Jan. 30, 2020

Related U.S. Application Data

(63) Continuation of application No. 14/586,574, filed on Dec. 30, 2014, now Pat. No. 10,438,261.

(51) Int. Cl.
*G06Q 30/06* (2012.01)
*H04L 67/02* (2022.01)
*H04W 4/14* (2009.01)
*H04L 67/306* (2022.01)
*H04L 67/53* (2022.01)

(52) U.S. Cl.
CPC ..... *G06Q 30/0623* (2013.01); *G06Q 30/0603* (2013.01); *G06Q 30/0613* (2013.01); *H04L 67/02* (2013.01); *H04L 67/306* (2013.01); *H04L 67/53* (2022.05); *H04W 4/14* (2013.01)

(58) Field of Classification Search
CPC ........... G06Q 30/0613; G06Q 30/0623; G06Q 30/0603; H04L 67/20; H04L 67/306; H04L 67/02; H04W 4/14

USPC ................................ 705/26.1, 26.41, 26.61
See application file for complete search history.

(56) References Cited

U.S. PATENT DOCUMENTS 8,412,560 B1 4/2013 Masud et al.
8,588,825 B2 11/2013 Jonsson
(Continued)

FOREIGN PATENT DOCUMENTS

CN 102158828 A 8/2011
KR 10-2010-0127307 A 12/2010
(Continued)

OTHER PUBLICATIONS

Article, "U.S. Patent and Trademark Office Releases Microsoft's Patent Application for Unpaired Devices", published Dec. 19, 2014 in Global IP News. Software Patent News [New Delhi]; retrieved from Dialog database on May 21, 2022.*

(Continued)

*Primary Examiner* — Yogesh C Garg
(74) *Attorney, Agent, or Firm* — Schwegman Lundberg & Woessner, P.A.

(57) ABSTRACT

Systems and methods are disclosed to receive a message from a user device. The message may include metadata that includes data related to one or more specifications of the user device. The method may also determine a sales price for the user device based on the one or more specifications of the user device and create a listing for the user device that includes at least the sales price and at least one of the one or more specifications of the user device.

16 Claims, 5 Drawing Sheets

(56) References Cited

U.S. PATENT DOCUMENTS

| | | | |
|---|---|---|---|
| 8,635,124 B1* | 1/2014 | Hamilton | G06Q 30/0625 |
| | | | 705/27.1 |
| 8,676,632 B1* | 3/2014 | Watson | G06Q 30/0206 |
| | | | 705/7.35 |
| 8,953,889 B1 | 2/2015 | Worley, III et al. | |
| 10,438,261 B2 | 10/2019 | Velusamy | |
| 2003/0083979 A1 | 5/2003 | Walker et al. | |
| 2003/0126139 A1* | 7/2003 | Lee | G06F 40/143 |
| 2004/0172372 A1* | 9/2004 | Wells | G06Q 30/0283 |
| | | | 705/400 |
| 2005/0131884 A1* | 6/2005 | Gross | G06F 16/951 |
| 2005/0177387 A1 | 8/2005 | Mojsa | |
| 2006/0224448 A1 | 10/2006 | Herf | |
| 2006/0265661 A1 | 11/2006 | Ball | |
| 2008/0019390 A1 | 1/2008 | Singh et al. | |
| 2008/0162203 A1 | 7/2008 | Shirk et al. | |
| 2008/0215456 A1 | 9/2008 | West et al. | |
| 2009/0248742 A1 | 10/2009 | Krishnamurthy et al. | |
| 2010/0017280 A1 | 1/2010 | Davis et al. | |
| 2010/0057586 A1 | 3/2010 | Chow | |
| 2010/0088185 A1 | 4/2010 | Wen et al. | |
| 2010/0131505 A1 | 5/2010 | Erickson | |
| 2010/0217684 A1 | 8/2010 | Melcher et al. | |
| 2011/0141974 A1 | 6/2011 | Lieberman | |
| 2011/0268047 A1 | 11/2011 | Nath et al. | |
| 2012/0197981 A1 | 8/2012 | Chan | |
| 2013/0191481 A1* | 7/2013 | Prevost | H04L 51/14 |
| | | | 709/206 |
| 2013/0238398 A1 | 9/2013 | Rothman | |
| 2013/0275314 A1 | 10/2013 | Bowles | |
| 2013/0282524 A1* | 10/2013 | Appolito | G06Q 50/16 |
| | | | 705/26.41 |
| 2013/0325664 A1 | 12/2013 | Alegre et al. | |
| 2014/0032300 A1* | 1/2014 | Zhang | G06Q 30/0207 |
| | | | 705/14.35 |
| 2014/0108154 A1 | 4/2014 | Aravanis et al. | |
| 2014/0114866 A1 | 4/2014 | Abhyanker | |
| 2014/0195384 A1 | 7/2014 | Hamilton et al. | |
| 2014/0358629 A1* | 12/2014 | Shivaswamy | G06Q 10/087 |
| | | | 705/7.29 |
| 2015/0046281 A1* | 2/2015 | Shivaswamy | G06Q 30/0631 |
| | | | 705/26.7 |
| 2015/0100578 A1* | 4/2015 | Rosen | G16H 40/67 |
| | | | 707/737 |
| 2015/0332362 A1 | 11/2015 | Kalt | |
| 2016/0189267 A1 | 6/2016 | Velusamy | |

FOREIGN PATENT DOCUMENTS

| | | | |
|---|---|---|---|
| KR | 1020120048525 A | 5/2012 | |
| KR | 1020140037543 A | 3/2014 | |
| WO | 2012/073027 A2 | 6/2012 | |
| WO | WO-2014070632 A2 * | 5/2014 | G06F 16/9558 |
| WO | 2016/109028 A1 | 7/2016 | |
| WO | 2016/109029 A1 | 7/2016 | |

OTHER PUBLICATIONS

Office Action received for Korean Patent Application No. 10-2018-7027034, dated May 6, 2020, 7 pages (4 pages of Official copy and 3 pages of English Translation).
Office Action received for Chinese Patent Application No. 201580072063.0, dated Apr. 1, 2020, 30 pages (12 pages of Official copy and 18 pages of English Translation).
U.S. Appl. No. 14/586,574, now U.S. Pat. No. 10,438,261, filed Dec. 30, 2014, Marketplace Listing Generation Using Message Metadata.
International Preliminary Report on Patentability received for PCT Application No. PCT/US2015/060429, dated Jul. 13, 2017, 7 pgs.
Non-Final Office Action received for U.S. Appl. No. 14/586,574, dated Oct. 6, 2017, 20 pgs.
Response to Non-Final Office Action filed Jan. 8, 2018, for U.S. Appl. No. 14/586,574, 18 pgs.
Final Office Action received for U.S. Appl. No. 14/586,574, dated Apr. 18, 2018, 23 pgs.
Response to Final Office Action filed Jul. 17, 2018, for U.S. Appl. No. 14/586,574, 16 pgs.
Advisory Action received for U.S. Appl. No. 14/586,574, dated Jul. 30, 2018, 4 pgs.
Response to Advisory Action filed Aug. 20, 2018, for U.S. Appl. No. 14/586,574, 16 pgs.
Non-Final Office Action received for U.S. Appl. No. 14/586,574, dated Oct. 12, 2018, 25 pgs.
Applicant Initiated Interview Summary received for U.S. Appl. No. 14/586,574, dated Nov. 9, 2018, 3 pgs.
Response to Non-Final Office Action filed Jan. 14, 2019, for U.S. Appl. No. 14/586,574, 23 pgs.
Notice of Allowance received for U.S. Appl. No. 14/586,574, dated Apr. 4, 2019, 11 pgs.
Notice of Allowance received for U.S. Appl. No. 14/586,574, dated May 23, 2019, 8 pgs.
Notice of Allowability received for U.S. Appl. No. 14/586,574, dated Aug. 13, 2019, 5 pgs.
International Search Report and Written Opinion received for PCT Application No. PCT/US2015/060429, dated Feb. 2, 2016, 7 pgs.
International Search Report and Written Opinion received for PCT Patent Application No. PCT/US2015/060435, dated Jan. 27, 2016, 10 pgs.
Extended European Search Report Received for European Patent Application No. 15875881.3, dated Jun. 12, 2018, 8 pgs.
Response to European Search Report filed Dec. 3, 2018 for European Patent Application No. 15875881.3, 16 pgs.
Communication Pursuant to Article 94(3) EPC received for European Patent Application No. 15875881.3, dated Jun. 28, 2019, 6 pgs.
Response to Communication Pursuant to Article 94(3) EPC filed Oct. 14, 2019 for European Patent Application No. 15875881.3, 19 pgs.
Notice of Preliminary Rejection received for Korean Patent Application No. 10-2017-7017985, dated Jan. 22, 2018, 12 pgs.
Response to Office Action filed Mar. 22, 2018 for Korean Patent Application No. 10-2017-7017985, 9 pgs.
Final Office Action received for Korean Patent Application No. 10-2017-7017985, dated Jul. 20, 2018, 7 pgs.
Appeal Brief filed Oct. 19, 2018, for Korean Patent Application No. 10-2017-7017985, 18 pgs.
Office Action received for Korean Patent Application No. 10-2018-7027034, dated Nov. 27, 2020, 12 pages (6 pages of Official Copy and 6 pages of English Translation).
Summons to Attend Oral Proceedings Received for European Patent Application No. 15875881.3, dated Nov. 4, 2020, 7 pages.
Office Action Received for Chinese Patent Application No. 201580072063.0, dated Sep. 27, 2020, 26 pages (10 pages of Official copy and 16 pages of English Translation).
International Preliminary Report on Patentability received for PCT Application No. PCT/US2015/060435, dated Jul. 13, 2017, 10 pages.
Decision of Rejection received for Chinese Patent Application No. 201580072063.0, dated Dec. 29, 2020, 15 pages (14 pages of official copy and 1 page of English translation).
"European Application Serial No. 21199794.5, Extended European Search Report dated Jan. 18, 2022", 9 pgs.

* cited by examiner

MARKETPLACE LISTING GENERATION USING MESSAGE METADATA

CROSS-REFERENCE TO RELATED APPLICATIONS

This application is a continuation of U.S. patent application Ser. No. 14/586,574, filed on Dec. 30, 2014, now U.S. Pat. No. 10,438,261, issued on Oct. 8, 2019; the disclosure of which is incorporated herein by reference in its entirety.

FIELD

This disclosure relates generally to marketplace listing generation using message metadata.

BACKGROUND

Many electronic marketplaces allow individuals to list various items for sale. To list items for sale, users may be required to enter information about their items, which may be time consuming and/or inaccurate. Some individuals may find the time it takes to list an item for sale in a marketplace as too burdensome. Moreover, inaccuracies in a listing can lead to a number of problems including a lack of trust between buyers, sellers, and the marketplace.

BRIEF DESCRIPTION OF THE DRAWINGS

These and other features, aspects, and advantages of the present disclosure are better understood when the following Detailed Description is read with reference to the accompanying drawings.

DETAILED DESCRIPTION

Systems and methods are disclosed to generate a listing in an electronic marketplace for a user device from metadata associated with an electronic message sent to the electronic marketplace. The electronic marketplace may use the metadata associated with the electronic message to determine details about the user device and automatically create a listing from the details of the user device. Embodiments described herein may provide a simple and accurate way for users to list a user device in an electronic marketplace. Moreover, embodiments described herein solve an e-commerce problem that is only found in e-commerce or electronic marketplaces.

Electronic messages communicated between a user device and an electronic marketplace (e.g., servers or websites hosted by a server) include metadata that is often mandated by communication protocols used to communicate the electronic messages. In some embodiments, additional metadata may be added to or metadata other than the protocol mandated metadata may be used in an electronic message. The additional or other metadata may include specifications of the user device that communicates the electronic messages. The specifications of the user device may include the make, model, or specifications of the user device, among other specifications. In general, embodiments described herein provide systems and methods that allow a user to create a listing in an electronic marketplace for a user device by sending a communication, such as a text message to a specific phone number, sending an email to a specific email address, selecting a specific link on a webpage, visiting a specific website, visiting a specific webpage (e.g., www.ebay.com/listthisdevice), or calling a specific phone number, clicking a button in an application or on a webpage, tweeting a message with a specific hashtag (e.g., # listthisdevice), using a voice command, using a specific gesture or motion, etc., from the user device to the electronic marketplace. In response, the electronic marketplace may automatically generate a listing for the user device in the electronic marketplace based on the specifications of the user device derived from metadata within the communication from the user device.

Figure 1:
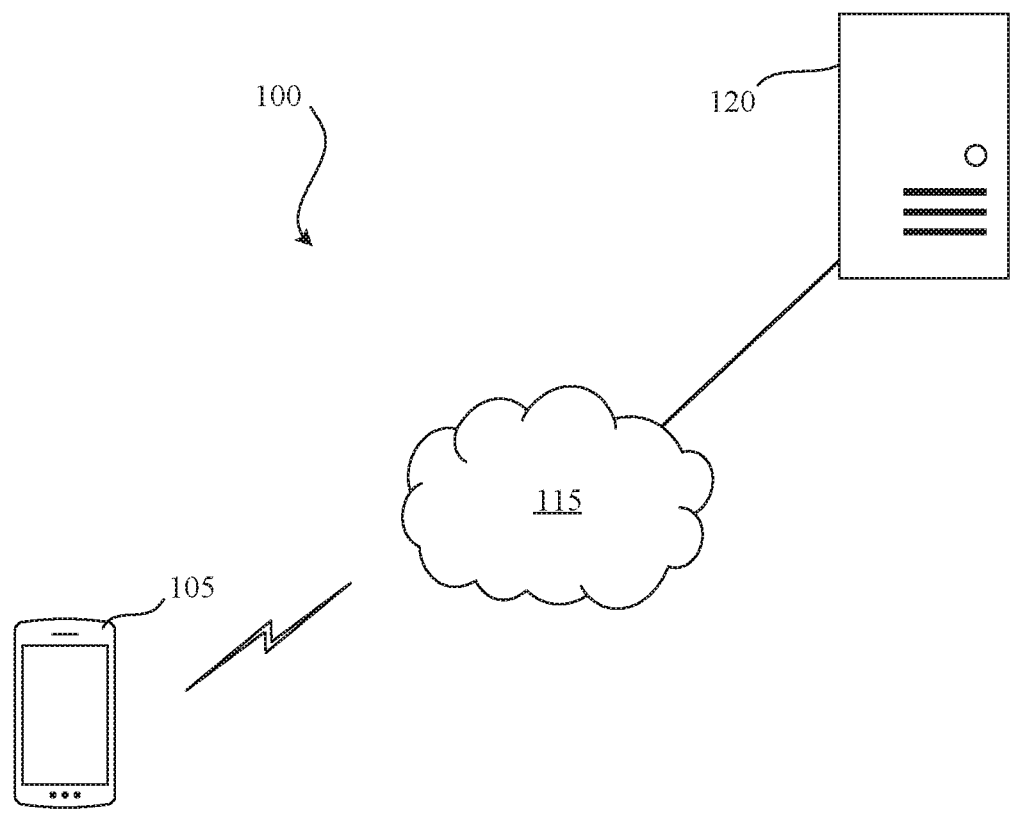
FIG. 1 illustrates an example architecture in which a user may interact with an electronic marketplace according to some embodiments described herein.

FIG. 1 illustrates an example architecture 100 in which a user may interact with an e-commerce marketplace according to some embodiments described herein. The architecture 100 includes a user device 105, a network 115 and an electronic marketplace 120. The user device 105 may be communicatively connected with the electronic marketplace 120 via the network 115 either through a wired or wireless connection.

The user device 105 may include any type of user device such as, for example, a mobile phone, a smartphone, a tablet, a smart watch, gaming console, media player, laptop computer, or desktop computer. In general, the user device 105 may include any device that may communicate electronically with the electronic marketplace 120 via the network 115.

The electronic marketplace 120 may host one or more websites that allow users to buy and/or sell items. The electronic marketplace 120 may include any configuration of hardware, such as servers and databases configured to provide an on-line marketplace for sellers to sell goods to buyers. For example, the electronic marketplace 120 may be configured to provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. The prices set for a transaction may be auction-format listing and price setting mechanisms (e.g., English, Dutch, Chinese, Double, Reverse auctions, etc.). Other types of price listing formats may also be used. For example, a fixed-price listing format (e.g., the traditional classified advertisement-type listing or a catalogue listing) or a buyout-type listing format may be used. In these and other embodiments, a buyout-type listing may be offered in conjunction with auction-format listings and allow a buyer to purchase goods or services, which are also being offered for sale via an auction, for a fixed price that is typically higher than a starting price of an auction for an item.

The network 115 may be any network or configuration of networks configured to send and receive communications between devices. In some embodiments, the network 115 may include a conventional type network, a wired or wireless network, and may have numerous different configurations. Furthermore, the network 115 may include a local area network (LAN), a wide area network (WAN) (e.g., the Internet), or other interconnected data paths across which multiple devices and/or entities may communicate. In some implementations, the network 115 may include a peer-to-peer network. The network 115 may also be coupled to or may include portions of a telecommunications network for sending data in a variety of different communication protocols. In some implementations, the network 115 includes Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 115 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 115 may include one or more IEEE 802.11 wireless networks.

Figure 2:
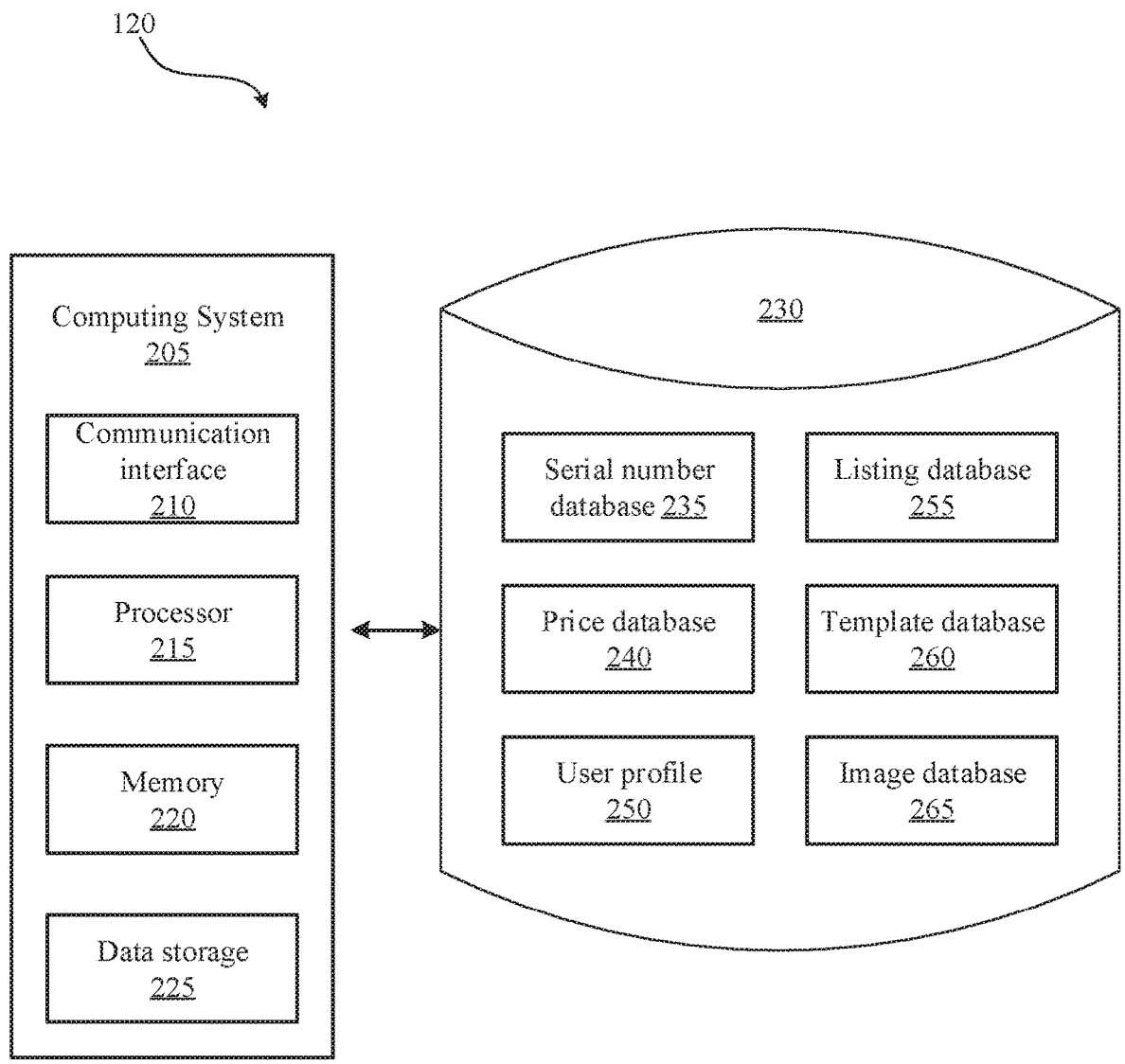
FIG. 2 illustrates a block diagram of some components of the electronic marketplace according to some embodiments described herein.

FIG. 2 illustrates a block diagram of a system 200 of some components of the electronic marketplace 120 according to some embodiments described herein. The electronic marketplace 120 may be arranged in accordance with at least one embodiment described herein. The electronic marketplace 120 may include computing system 205 and database 230. The computing system 205 may include a communication interface 210, a processor 215, a memory 220, and data storage 225. One or more of the communication interface 210, the processor 215, the memory 220, and the data storage 225 may be communicatively coupled.

In some embodiments, the communication interface 210 may be used by the computing system 205 to communicate with the network 115 and/or the user device 105 of FIG. 1. In some embodiments, the communication interface 210 may communicate with the network 115 and/or the user device 105 using any communication protocol, interface, standard, etc. In some embodiments, the communication interface 210 may communicate with the network 115 and/or the user device 105 using a wired or wireless connection.

In some embodiments, the processor 215 may include any suitable special-purpose or general-purpose computer, computing entity, or processing device including various computer hardware or software modules and may be configured to execute instructions stored on any applicable computer-readable storage media. For example, the processor 215 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 215 may include any number of processors configured to perform individually or collectively any number of operations described herein. Additionally, one or more of the processors may be present on one or more different electronic devices, such as different servers. In some embodiments, the processor 215 may interpret and/or execute program instructions and/or process data stored in the memory 220, the data storage 225, or the memory 220 and the data storage 225. In some embodiments, the processor 215 may fetch program instructions from the data storage 225 and/or the database 230 and load the program instructions in the memory 220. After the program instructions are loaded into the memory 220, the processor 215 may execute the program instructions.

In some embodiments, the memory 220 and the data storage 225 may include computer-readable storage media for carrying or having computer-executable instructions or data structures stored thereon. Such computer-readable storage media may be any available media that may be accessed by a general-purpose or special-purpose computer, such as the processor 215. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 215 to perform a certain operation or group of operations.

In some embodiments, the database 230 may be communicatively coupled with the computing system 205. The database 230 may include one or more other databases such as, for example, a serial number database 235, a price database 240, a user profile database 250, a listing database 255, a template database 255, and an image database 265. The database 230 may also include multiple modules, that when executed by the processor 215, may cause the computing system 205 to perform operations that may create a listing for the user device 105 based on metadata received from the user device 105.

In some embodiments, the database 230 may include computer-readable storage media for carrying or having computer-executable instructions or data structures stored thereon. Such computer-readable storage media may be any available media that may be accessed by a general-purpose or special-purpose computer, such as the processor 215. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 215 to perform a certain operation or group of operations.

In some embodiments, the serial number database 235 may include a lookup table correlating serial numbers of user devices (or a range of serial numbers) with features of the user device 105. Table 1 is an example of such a lookup table.

TABLE 1

| Serial number | Manufacturer | Model | Memory |
|---|---|---|---|
| 176148 | Apple | iPhone 5S | 32 GB |
| 27B9C8 | Samsung | Galaxy S5 | 16 GB |
| AA7568 | Apple | iPad Air | 64 GB |

The price database 240 may store sales price information that includes sales price data for various electronic devices based on the configuration of the electronic device. For example, the configuration of an electronic device may include the manufacturer of the device, the model of the device, the memory types of the device, the memory size of the different memory types, the condition of the device, the year the device was manufactured, the operating system executing on the user device, the camera specifications, the battery specifications, the number and/or types of applications installed on the user device, the size of the display, or some combination thereof.

In some embodiments, the sales price information may be kept up-to-date based on the sale prices of devices currently being sold. As sales prices increase or decrease, the sales price information stored at the electronic marketplace 120 may be updated to reflect the current sales price.

In some embodiments, the price database 240 may include a lookup table correlating various specifications or configurations of the user device 105 with a sales price. Table 2 is an example of such a lookup table.

TABLE 2

| Manufacturer | Model | Memory | Price |
|---|---|---|---|
| Apple | iPhone 5S | 32 GB | $237 |
| Samsung | Galaxy S5 | 16 GB | $350 |
| Apple | iPad Air | 64 GB | $250 |

In some embodiments, the user profile database 250 may include information related to various users of the electronic marketplace 120. For each user, this information may include, for example, demographic data, which may include, the age, gender, ethnicity, among other data, a user location, a shopping history, a purchasing history, items most recently viewed, items most recent items purchased, items most recent items placed in a virtual shopping cart but not purchased, preferred shipping options, credit card information, listing information, an address, a telephone number, etc.

In some embodiments, the user profile database 250 may also include listing preferences for users. The listing preferences of a user may include auction preferences, auction duration preferences, shipping preferences, store front graphics, store name, user name, comments, ratings, payment preference, or some combination thereof.

In some embodiments, the listing database 255 may include listings of products listed for sale in the electronic marketplace 120. The listing database 255 may also include listings of products that have been created but not published.

In some embodiments, the template database 260 may be used to create a listing for the user device 105. For example, the template database 260 may include a plurality of templates corresponding to a listing of a make and/or model of the user device 105. For example, a template may be included for an Apple iPhone 5S, a Samsung Galaxy S5, an Apple iPad Air, etc.

In some embodiments, the image database 265 may include a plurality of images of different devices that may be used to populate a listing of the user device 105. For example, the image database 265 may include an image of various models or styles of an Apple iPhone 5S, a Samsung Galaxy S5, an Apple iPad Air, etc.

In view of this disclosure, it will be appreciated that modifications, additions, or omissions may be made to the electronic marketplace 120 without departing from the scope of the present disclosure. For example, the computing system 205 and the database 230 may be communicatively coupled by a network, such as the network 115 of FIG. 1. Alternately or additionally, the electronic marketplace 120 may include multiple computing systems 205 that may operate to execute one or more of the processes described herein.

Figure 3:
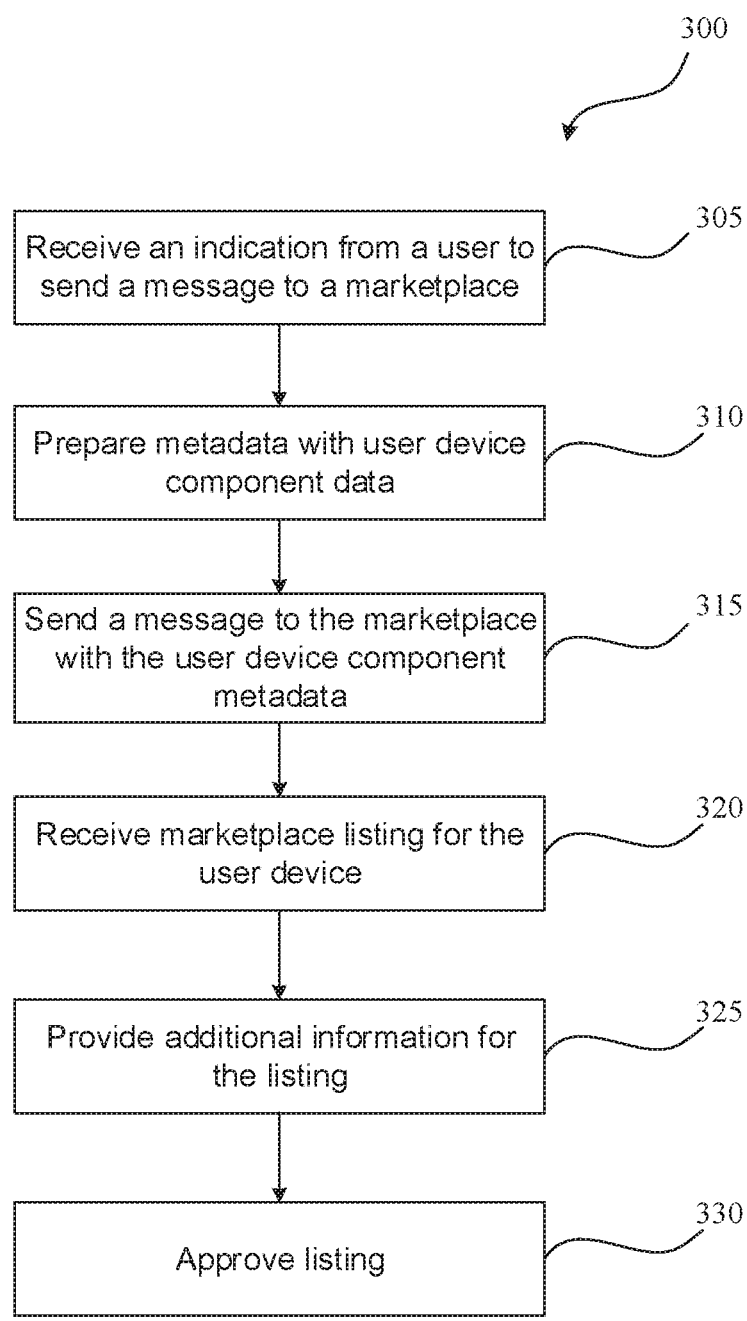
FIG. 3 is a flowchart of an example process for automatically listing the user device in an electronic marketplace, according to at least one embodiment described herein.

FIG. 3 is a flowchart of an example process 300 for automatically listing the user device 105 in a marketplace, according to at least one embodiment described herein. One or more steps of the process 300 may be implemented, in some embodiments, by the user device 105 of FIG. 1. Although illustrated as discrete blocks, various blocks may be divided into additional blocks, combined into fewer blocks, or eliminated, depending on the desired implementation.

Process 300 begins at block 305, where the user device 105 receives an indication from a user of the user device 105 to list the user device 105 in the electronic marketplace 120. The indication may be received through the user interface of the user device 105 in a number of different ways. In some embodiments, the user may manipulate a user interface of the user device 105 to enter the specific number or address in the "TO:" field of a text messaging application, app, or program.

In some embodiments, the user may manipulate a user interface of the user device 105 to send an email message to a specific email address. For example, the user may enter the specific email address in the "TO:" field of an email application, app, or program. The specific email address may be identified indicating that the user of the user device 105 wishes to sell the user device 105 in the marketplace associated with the specific email address.

In some embodiments, the user may manipulate a user interface of the user device 105 to select a link on a webpage. For example, the user may be browsing a webpage and view an advertisement suggesting that the user can sell their user device by selecting the link. When the link has been selected, the user device 105 may determine that the user wishes to sell the user device 105 in the marketplace associated with the link.

The indication may include any type of message and be formatted using the proper protocols for a given communication channel such as, for example, an SMS message channel, a text message channel, an email message channel, HTTP channel, etc.

At block 310, metadata can be prepared that includes user device component data. For example, the metadata may include information regarding the manufacturer of the user device 105, the make of the user device 105, the model of the user device 105, any number of specifications of the user device 105 (e.g., memory, speed, size, color, etc.), or some combination thereof, etc. In some embodiments, the metadata may include metadata that is standard to the protocol for the given communication channel.

In some embodiments, the metadata may be prepared prior to block 305. The metadata may be prepared, for example, with a user agent process, module, software agent, software, or some combination thereof, etc. The metadata may be included in a string of metadata. In some embodiments, the metadata may be included in a metadata file stored at the user device 105.

In some embodiments, the metadata may include metadata that is standard to the protocol for the given communication channel. In some embodiments, the metadata may include the International Mobile Station Equipment Identity (IMEI), the International Mobile Equipment Identity (IMEI), the International Mobile Subscriber Identity (IMSI) number, a Mobile Subscriber Integrated Services Digital Network (MSISDN) number, the Mobile Equipment Identifier (MEID), Short Message Entity (SME), or some combination thereof. The metadata may also include other data collected from the user device 105 memory.

In some embodiments, the metadata may not be standard to the protocol for the given communication channel and may include metadata in addition to the standard data.

At block 315, the message with the metadata may be sent to the electronic marketplace 120 with the user device 105 metadata using any number of communication channels or techniques. For example, the user device 105 metadata may be sent to the electronic marketplace 120 as part of an HTTP message such as, for example, an HTTP user-agent string. The HTTP user-agent string may include information regarding the application sending the HTTP message, the platform of the user device 105, the operating system executing on the user device 105, the model of the user device 105, the serial number of the user device 105, user device firmware version, etc., or some combination thereof.

For example, the following is an example HTTP user agent string, "Mozilla/5.0 (Linux; U; Android 2.2; en-sa; HTC_DesireHD_A9191 Build/FRF91) AppleWebKit/533.1 (KHTML, like Gecko) Version/4.0 Mobile Safari/533.1" that includes a number of fields that may be sent by a HTC Desire HD model number A9191. The field stating "HTC_DesireHD_A9191" specifies that the device is an HTC Desire HD user device and the model is the A9191 model of the HTC Desire HD.

As another example, the user device 105 metadata may be sent from the user device 105 to the electronic marketplace 120 as part of an SMS message metadata associated with an SMS message. In some embodiments, an SMS message may include at least one of an IMEI and a MEID. The IMEI may include a number of digits that represent a TAC value, a FAC value, a serial number of the user device 105, a software number, or some combination thereof. The serial number of the user device 105 may be extracted from The IMEI.

The MEID may include a string of digits that includes regional codes, manufacturer codes, serial numbers, and a check digit. The serial number of the user device 105 may be extracted from the MEID.

If a serial number or the model number of the user device 105 is extracted from the IMEL, the MEID, HTTP user agent string, or any other metadata of any protocol, then the serial number may be looked up in a database and specifications for the user device 105 associated with the serial number may be returned from the database. A database that may return the specification for the user device 105 based on a serial number in a message may be the serial number database 235. Alternatively or additionally, the serial number may include digits that represent various specifications of the user device 105.

In response to receiving the message from the user device 105, the electronic marketplace 120 may create a listing for the user device 105. This can be done, for example, as described in FIG. 4.

In response, at block 320, a listing for the user device 105 in the marketplace may be received from the electronic marketplace 120. The listing may include details about the user device 105 that was included in the metadata provided in block 315 in addition to other details about the user device 105 extracted from the metadata provided in block 315.

At block 325, the user may enter additional information for the listing through the user device 105 or through another electronic device. This can be done, for example, using a web browser or a stand-alone app, application or program executing on the user device 105.

At block 330, the user may approve the listing through the user device. The user, for example, may approve the listing by selecting a button, entering a username, and/or entering a password via a user interface that is provided by a web browser, an app, an application, or a program executing on the user device 105. In response, a message may be sent from the user device 105 to the electronic marketplace 120 notifying the electronic marketplace 120 that the user approves the listing. As another example, the user device 105 may send a second message to the electronic marketplace 120 using the same channel that the metadata was sent on, which may notify the electronic marketplace 120 that the listing is approved.

Figure 4:
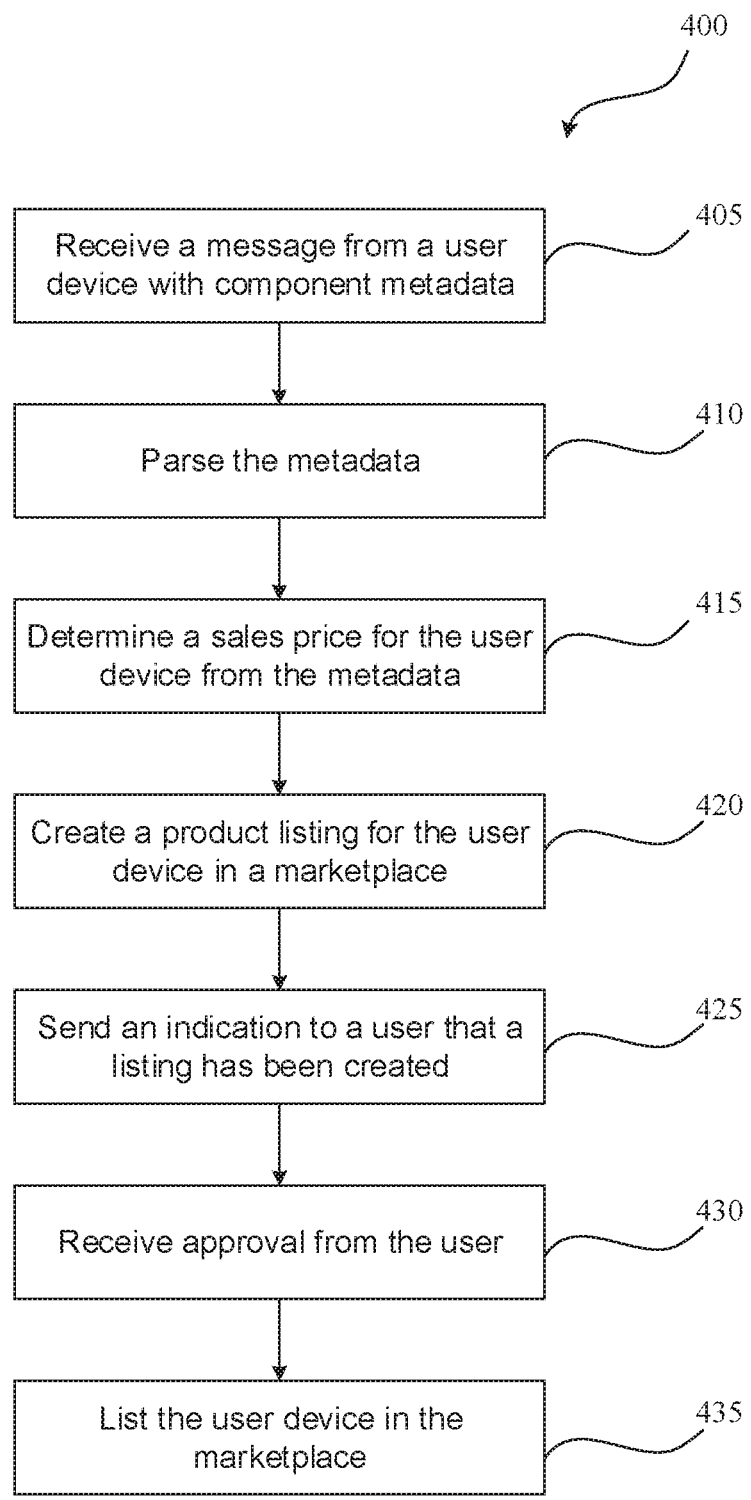
FIG. 4 is a flowchart of an example process executing at the electronic marketplace for automatically listing the user device in the electronic marketplace according to at least one embodiment described herein.

FIG. 4 is a flowchart of an example process 400 executing at the electronic marketplace 120 for automatically listing the user device 105 in an electronic marketplace according to at least one embodiment described herein. One or more steps of the process 400 may be implemented by the electronic marketplace 120 illustrated in FIG. 1 and FIG. 2. Although illustrated as discrete blocks, various blocks may be divided into additional blocks, combined into fewer blocks, or eliminated, depending on the desired implementation.

Process 400 begins at block 405, where the electronic marketplace 120 may receive a message from the user device 105. The message may have been sent from the user device 105, for example, at block 315. The message may be sent via one of any number of communication channels. The message may include, for example, a text message, SMS message, email message, HTTP request, etc. The message may include metadata that includes user device component data, which may be parsed at block 410 to extract or determine the component data from the metadata. The component data may include the make, model, specifications, or some combination thereof of the user device 105.

In some embodiments, the message may be parsed using the serial number database 235. For example, the metadata may include the serial number of the user device 105. This serial number may be used to look up the component data in the serial number database 235.

At block 415, a sales price for the user device 105 may be determined from the component data. The sales price may be determined, for example, using the price database 240. The electronic marketplace 120 may use the component data to look up a sales price for the user device 105 in the price database 240. For example, using Table 2, if the component data indicates that the user device 105 is a Samsung Galaxy S5 with 16 GB of memory, then the sales price may be determined to be $350.

At block 420, a product listing for the user device 105 may be created in the marketplace using the component data and the sales price. The listing may be saved in the listing database 255.

In some embodiments, to create a product listing, a listing template may be retrieved from the template database 260. A template from the template database 260 may be retrieved from the template database 260 based on the component data. Various fields of the listing template may be populated or filled in with metadata, the component data, the sales price, or some combination thereof.

In some embodiments, user profile data may be retrieved from the user profile database 250 and used to fill in some fields of the template. User profile data, for example, may also be determined from the metadata associated with the message received from the user device 105. For example, if the message was received via SMS text, then user profile data may be determined from the MSISDN (or similar number) or the phone number of the user device 105 from which the message was sent. The MSISDN or phone number may be associated with a specific user in a lookup table stored in memory with the electronic marketplace 120. The user profile data, for example, may include listing preferences for the user.

In some embodiments, an image of the user device 105 may be retrieved from the image database 265 and used in the listing.

At block 425, an indication may be sent to the user device 105 that a listing has been created to sell the user device 105. The indication may include a link to a network location where the listing may be viewed such as, for example, a webpage. The indication may be sent using any communication channel such as, for example, the same communication channel used to send the message from the user device 105 to the electronic marketplace 120 or a different communication channel. For example, if the message received at block 405 was sent via an SMS text communication channel, then the indication sent at block 425 may also be sent via the SMS text communication channel. As another example, if the message received at block 405 was sent via email, then the indication sent at block 425 may also be sent via email. Alternatively, for example, the indication may be sent using a different communication channel than the communication channel used at block 405.

At block 430, an approval from the user may be received at block 430. The approval may indicate that the listing is approved and should be listed in the marketplace. In some embodiments, the approval may include additional listing information or additional listing information may be sent to the electronic marketplace 120 prior to block 430.

At block 435, the user device 105 may be listed in the marketplace with the sales price determined at block 415.

Process 400 may be used to list the user device 105 in the marketplace using any number of communication channels. For example, the process 400 may be used to list the user device 105 by receiving a message via an SMS message. For example, at block 405 an SMS message may be received at the electronic marketplace 120 from the user device 105. The SMS message may or may not include data other than metadata. The metadata may include either or both an IMEI or a MEID. Either of these identifiers includes the serial number of the user device 105. At block 410, the serial number of the user device 105 may be parsed from the IMEI or MEID, which may be a certain set of characters in the IMEI or MEID. Alternatively or additionally the metadata may include a description of user device 105.

The electronic marketplace 120 may look up the serial number in a serial number database 235 to determine the make and model of the user device 105 and any other specifications of the user device 105. At block 415, a sales price may be determined based on the make, model, and specifications of the user device 105. The sales price may be determined for example using the price database 240.

At block 420, a product listing for the user device 105 may be created in the marketplace based on the make, model, features or some combination thereof of the user device 105 and stored in the listing database 255. The listing may also include a description of the user device 105 and/or include an image of the user device 105. At block 425, an SMS message may be sent to the user indicating that a listing for the user device 105 has been created. The SMS message may include a link to the listing that may be opened in a web browser or another application executing on the user device 105.

The user of the user device 105 may approve the listing and send an indication of such approval to the electronic marketplace 120 at block 430. The approval may be sent via SMS message, through a message sent from an app executing on the user device 105, through an HTTP message, or some combination thereof, etc. At block 435, the listing of the user device 105 may be published in the marketplace.

Figure 5:
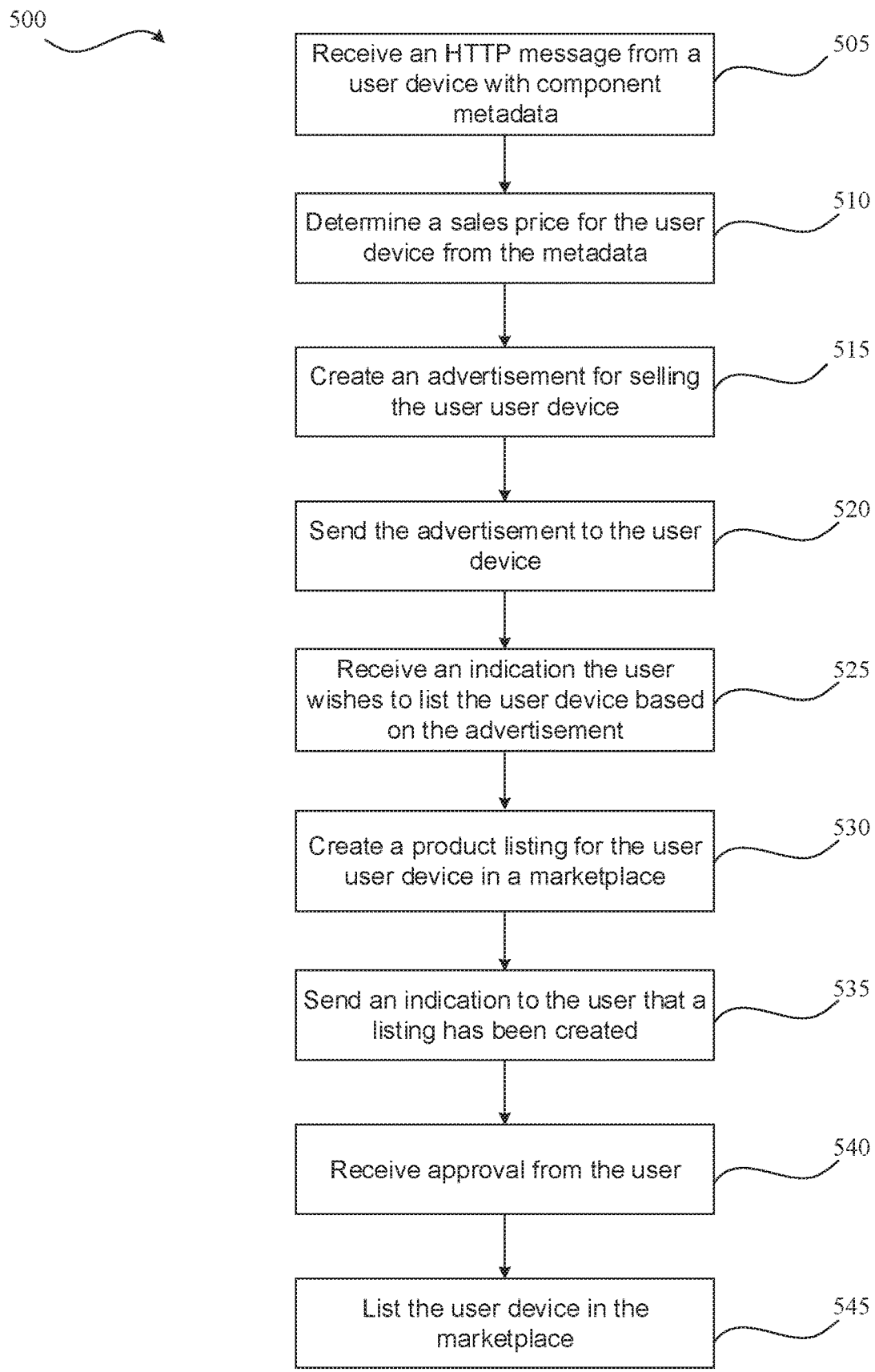
FIG. 5 is a flowchart of an example process executing at the electronic marketplace for automatically listing a device in the electronic marketplace, according to at least one embodiment described herein.

FIG. 5 is a flowchart of an example process 500 executing at the electronic marketplace 120 for automatically listing a device in an electronic marketplace, according to at least one embodiment described herein. One or more steps of the process 500 may be implemented, in some embodiments, by the electronic marketplace 120 of FIG. 1 and FIG. 2. Although illustrated as discrete blocks, various blocks may be divided into additional blocks, combined into fewer blocks, or eliminated, depending on the desired implementation.

At block 505, an HTTP message may be received at the electronic marketplace 120 from the user device 105. In some embodiments, the message may include metadata describing the user device 105. For example, the HTTP message may include an HTTP user-agent string that specifies the make, model, features, serial number, or some combination thereof of the user device 105. The HTTP message may include any type of HTTP message such as, for example, to request a network resource such as a webpage or the like.

At block 510, a sales price for the user device 105 may be determined from the metadata. In some embodiments, component data of the user device may be determined from the HTTP message using, for example, the serial number database 235. In some embodiments, the sales price may be determined using the price database 240 in the database 230 shown in FIG. 2.

At block 515, an advertisement for selling the user device 105 may be created. In some embodiments, the advertisement may include the sales price determined at block 510, the make of the user device 105, model of the user device 105, specifications of the user device 105, or some combination thereof. In some embodiments, the advertisement may use an advertising template stored in the template database 260 of the database 230 shown in FIG. 2. In some embodiments, the advertisement may also include user specific information such as the user's name. The user specific information, for example, may be retrieved from the user profile database 250 of database 230 shown in FIG. 2. In some embodiments, the advertisement may also include an image of the user device 105. The image of the user device 105, for example, may be retrieved from the image database 265 of the database 230 shown in FIG. 2. In some embodiments, the advertisement may include a link that may be selected to indicate that the user wishes to list the user device 105 for sale through the marketplace. The advertisement may include various other text, images, information, data, specifications, or some combination thereof.

At block 520, the advertisement may be sent to the user device 105. In some embodiments, the HTTP message received at block 505 may request retrieval of a webpage. The advertisement may be sent to the user device 105 as part of the webpage, which may be sent in response to the HTTP message received at block 505. In some embodiments, the advertisement may be sent in response to a future HTTP message.

At block 525, an indication that the user wishes to list the user device 105 based on the advertisement may be received at the electronic marketplace 120. In some embodiments, the indication may include an HTTP message such as, for example, an indication that the user has selected a link that indicates that the user wishes to sell the user device 105.

At block 530, a listing for the user device 105 may be created in the marketplace. In some embodiments, the listing may be similar to the listing created at block 420 of process 400 shown in FIG. 4 and/or may use a listing template from the template database 260. The listing may be stored in the listing database 255.

At block 535, an indication may be sent to the user such as, for example, to the user device 105, that a listing has been created. This indication may be sent in a manner similar to the indication sent out at block 425 of process 400 shown in FIG. 4. In some embodiments, the indication may be sent to the user of a different device other than the user device 105. In some embodiments, the indication may be sent to the user using a different communication channel other than through the HTTP channel. The indication may be sent, for example, via text message, email, phone, etc., or some combination thereof.

At block 540, approval for publishing the listing may be received from the user. The approval may be received in a manner similar to the approval received at block 430 of process 400 shown in FIG. 4.

At block 545, the user device 105 may be published and listed in the marketplace.

Systems and methods are disclosed to receive a message from a user device, the message comprising metadata that includes data related to one or more specifications of the user device. Systems and methods are also disclosed to determine a sales price for the user device based on the one or more specifications of the user device and create a listing for the user device that includes at least the sales price and at least one of the one or more specifications of the user device.

In some embodiments, the sales price for the user device is automatically determined from the one or more specifications of the user device. In some embodiments, the determining of a sales price for the user device includes looking up a sales price in a database based on the one or more specifications of the user device. In some embodiments, the creating of a listing for the user device includes creating a webpage that includes the sales price and at least one of the one or more specifications of the user device.

In some embodiments, the metadata comprises data selected from the list consisting of an International Mobile Station Equipment Identity (IMEI), an International Mobile Equipment Identity (IMEI) data, an International Mobile Subscriber Identity (IMSI) number, a Mobile Subscriber Integrated Services Digital Network (MSISDN) number, a Mobile Equipment Identifier (MEID), and a Short Message Entity (SME).

In some embodiments, the metadata includes at least one of International Mobile Station Equipment Identity (IMEI) and a Mobile Equipment Identifier (MEID), and the method further comprises extracting the serial number from either the Mobile Equipment Identifier (MEID) or the International Mobile Station Equipment Identity (IMEI); and looking up the serial number in a database and returning the specifications of the user device associated with the serial number.

In some embodiments, the method may include determining a user profile for the user of the user device based on the metadata, wherein the listing is created based on preferences associated with the user profile.

In some embodiments, the method may be executed by one or more non-transitory computer-readable media storing one or more programs that are configured, when executed, to cause one or more processors to execute any method described herein.

Methods are disclosed to receive a message through an HTTP request for a webpage from a device, the HTTP request comprising metadata that includes data related to one or more specifications of the user device. The method may also include determining a sales price for the user device based on the one or more specifications of the user device; creating an advertisement for the user device that includes at least the sales price and at least one of the one or more specifications of the user device; and providing the advertisement to the user device as part of the webpage.

In some embodiments, the method may include receiving an indication from the user device to create a listing for selling the user device; creating a listing for the user device that includes at least the sales price and at least one of the one or more specifications of the user device; and providing an indication to the user device that the listing has been created.

In some embodiments, the method may include receiving approval from the user device to list device results in the marketplace; and publishing the listing in the marketplace.

In some embodiments, the method may include receiving additional information from the user device regarding the listing; and updating the listing with the additional information. In some embodiments, the method may include determining a user profile for a user of the user device based on the metadata, wherein the listing is created based on preferences associated with the user profile.

In some embodiments, the method may be executed by one or more non-transitory computer-readable media storing one or more programs that are configured, when executed, to cause one or more processors to execute any method described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
    receiving, by a processor, a hypertext transfer protocol (HTTP) message that includes a user agent string and metadata associated with a communication protocol of the HTTP message from a user device;
    determining component data for the user device from the HTTP message user agent string, the component data comprising one or more specifications of the user device;
    determining a sales price of the user device based on the one or more specifications identified from the HTTP message;
    retrieving an image of the user device from a database separate from the user device based on the one or more specifications identified from the HTTP message;
    retrieving sales price information for devices being sold based on the one or more specifications;
    updating the sales price based on the sales price information for devices being sold; and
    generating a product listing in a webpage at an online marketplace website, the product listing comprising the sales price, the retrieved image of the user device, and the one or more specifications.

2. The method of claim 1, wherein receiving the HTTP message further includes receiving details about the user device inherent in the from the user device, the details mandated by pre-determined. communication protocols.

3. The method of claim 2, wherein receiving details about the user device further comprises receiving details related to a make of the user device, a model of the user device, a serial number of the user device, component data associated with the user device, or a combination thereof.

4. The method of claim 1, wherein the metadata includes at least one of:
    an International Mobile Station Equipment Identity (IMEI), an International Mobile Equipment Identity (MEI) data, an International Mobile Subscriber Identity (IMSI) number, a Mobile Subscriber Integrated Services Digital Network (MSISDN) number, a :Mobile Equipment Identifier (MEID), and a Short Message Entity (SME).

5. The method of claim 1, wherein receiving the metadata further comprises:
    receiving at least one of an international Mobile Station Equipment Identity (IMEI) or a Mobile Equipment Identifier (MEID), and the method further comprises:
    extracting a serial number from either the Mobile Equipment Identifier (MEID) or the International Mobile Station Equipment Identity (IMEI);
    searching for the serial number in a data storage; and
    obtaining the specifications of the user device associated with the serial number from the data storage.

6. The method of claim 1, wherein determining the sales price further comprises automatically determining the sales price based on at least one current sales price of at least one other device currently listed for sale in the online marketplace website that also includes at least some of the one or more specifications of the user device.

7. The method of claim 1, wherein generating the product listing further comprises creating a webpage that includes the sales price and at least one of the one or more specifications of the user device.

8. The method of claim 7, further comprising:
    creating an advertisement for the user device that includes at least the sales price and at least one of the one or more specifications of the user device; and
    providing the advertisement, to the user device as part of the webpage.

9. The method of claim 1, further comprising:
receiving additional specifications associated with the user device; and
automatically updating the listing with the additional specifications.

10. A system comprising:
a communication interface configured to receive a hypertext transfer protocol (HTTP) message that includes a user agent string and metadata associated with a communication protocol of the HTTP message from a user device;
a data storage; and
a processor electronically coupled with the communication interface and the data storage, the processor configured to execute instructions to cause the system to perform operations, the operations comprising:
determining component data for the user device from the HTTP message user agent string the component data comprising one or more specifications of the user device;
determining a sales price of the user device based on the one or more specifications identified from the HTTP message;
retrieving an image of the user device from a database separate from the user device based on the one or more specifications identified from the HTTP message;
retrieving sales price information for devices being sold based on the one or more specifications;
updating the sales price based on the sales price information for devices being sold; and
generating a product listing in a webpage at an online marketplace website, the product listing comprising the retrieved image of the of the user device, the sales price and at least one of the one or more specifications.

11. The system of claim 10, wherein the operations further comprise:
receiving additional specifications associated with the user device; and
automatically updating the listing with the additional specifications.

12. The system of claim 10, wherein the component data further comprises pre-determined communication protocols.

13. The system of claim 10, wherein the metadata includes at least one of: an International Mobile Station Equipment Identity (IMEI), an International Mobile Equipment Identity (IMEI) data, an International Mobile Subscriber Identity (IMSI) number, a Mobile Subscriber Integrated Services Digital Network (MSISDN) number, a Mobile Equipment Identifier (MEID), and a Short Message Entity (SME).

14. The system of claim 10, wherein the metadata includes at least one of an International Mobile Station Equipment Identity (IMEI) or a Mobile Equipment Identifier (MEID) and parsing the data from the electronic communication includes extracting a serial number from either the Mobile Equipment Identifier (MEID) or the International Mobile Station Equipment Identity (IMEI), wherein the operations further comprise:
searching for the serial number in the data storage; and
obtaining the specifications of the user device associated with the serial number from the data storage.

15. The system of claim 10, wherein the operations further comprise:
automatically determining the sales price based on the one or more specifications of the user device and at least one current sales price of at least one other device currently listed for sale in the online marketplace that also includes at least some of the one or more specifications of the user device.

16. A non-transitory machine-readable medium having stored thereon machine-readable instructions executable to cause a machine to perform operations comprising:
receiving a hypertext transfer protocol (HTTP) message that includes a user agent string and metadata associated with a communication protocol of the HTTP message from a user device;
determining component data for the user device from the HTTP message user agent string, the component data comprising one or more specifications of the user device;
determining a sales price of the user device based on the one or more specifications identified from the HTTP message;
retrieving an image of the user device from a database separate from the user device based on the one or more specifications identified from the HTTP message:
retrieving sales price information for devices being sold based on the one or more specifications;
updating the sales price based on the sales price information for devices being sold; and
generating a product listing in a webpage at an online marketplace website, the product listing comprising the sales price, the retrieved image of the user device, and the one or more specifications.

* * * * *